United States Patent

[11] 3,578,145

[72] Inventor Guenther L. Kuehl
       Peekskill, N.Y.
[21] Appl. No. 798,366
[22] Filed Feb. 11, 1969
[45] Patented May 11, 1971
[73] Assignee Guenther Systems, Inc.
       Buchanan, N.Y.

[54] TRANSPORT DEVICE
     8 Claims, 14 Drawing Figs.
[52] U.S. Cl. .................................................. 198/115,
     198/154, 214/38, 214/83.26, 214/83.36
[51] Int. Cl. ...................................................... B65g 21/12,
     B65g 67/00
[50] Field of Search .......................................... 214/38.22,
     512; 198/109, 113—115, 154

[56] References Cited
     UNITED STATES PATENTS
3,024,891  3/1962  Sawrie ........................... 198/154
3,051,295  8/1962  Moy ............................... 198/115
3,184,039  5/1965  Czarnecki ...................... 198/154
3,262,832  8/1966  Williams et al. .............. 214/512

Primary Examiner—Robert G. Sheridan
Attorney—Brumbaugh, Graves, Donohue & Raymond ABSTRACT: In the several embodiments of the invention described herein, an adjustable transport device is provided which includes a multiple chain drive system for transporting unit loads of material between a number of vertically and laterally displaced locations. In one embodiment, the device is provided as a truck attachment, and in a second embodiment, the vertical lift is permanently installed in a truck dock. In the third embodiment, a transport device for aircraft and the like carriers is provided with self-adjusting features and a unique platform construction. In a fourth embodiment, a transport device provides perpetual motion bridging for transporting people or material across obstacles and in the fifth and sixth embodiments, telescoping transport devices are provided. In a seventh embodiment, an inverted transport system is provided for transporting unit loads of material between at least three locations.

INVENTOR.
GUENTHER L. KUEHL

BY Brumbaugh, Graves, Donohue & Raymond his ATTORNEYS.

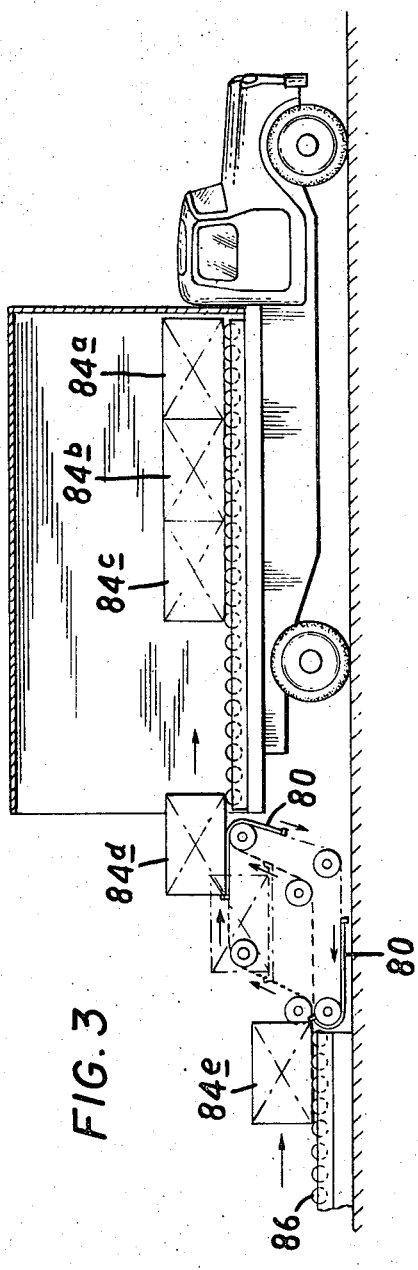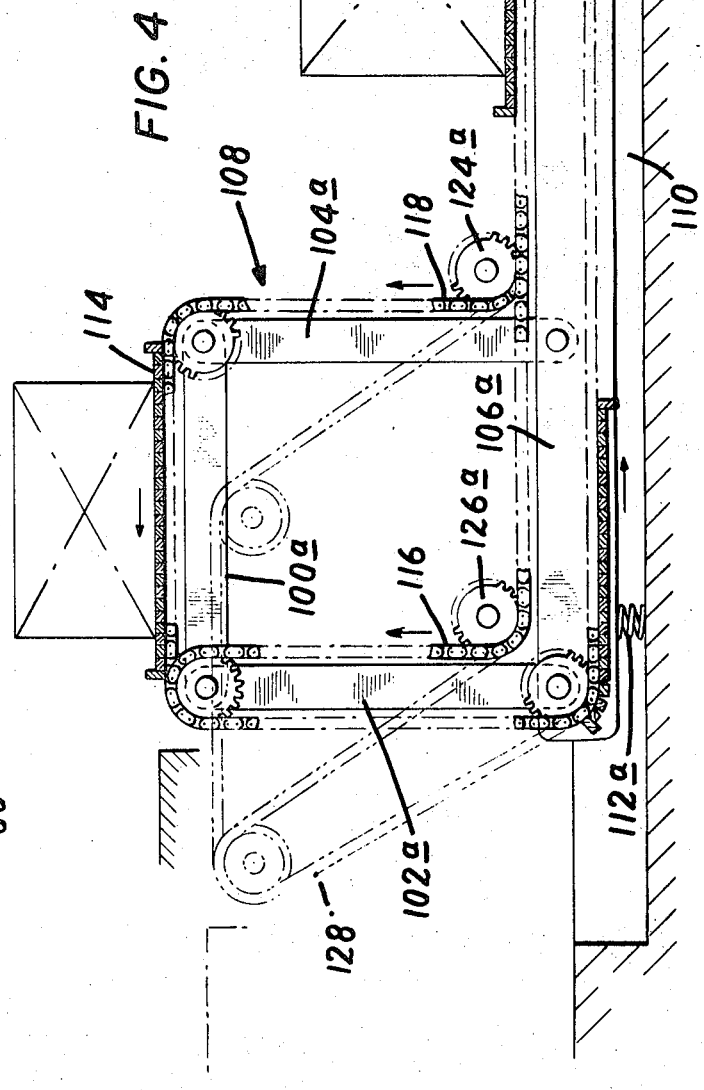

INVENTOR.
GUENTHER L. KUEHL
BY Brumbaugh, Graves,
Donohue & Raymond
his ATTORNEYS

TRANSPORT DEVICE

BACKGROUND OF THE INVENTION

This invention relates to conveyor apparatus and, more particularly, to apparatus for automatically transporting unit loads of material between vertically and laterally separated loading and unloading stations.

In many cargo loading systems for trucks and the like, the cargo is carried to a platform or truck dock by a conveyor belt and then picked up and loaded onto the truck by a fork lift truck. Where pallets are employed to carry the cargo, the cargo carrying pallet is transferred from the loading platform to the truck and then separated from the cargo in the truck itself. In another type loading system, vertical lifts are provided to convey the cargo between a truck and the loading platform. A common vertical lift is the double chain type which carries a platform to support the cargo, the platform remaining in a horizontal position during vertical movement by the supporting chains.

While the vertical lift type loading system provides obvious advantages over those systems utilizing fork lift trucks, a disadvantage with such systems is that each system must be uniquely designed to accommodate the expected vertical displacement between the cargo carrying trucks and the platform at each particular installation. For example, one installation may require a plurality of differently dimensioned vertical lift systems to accommodate the expected differences in truck sizes. In addition, because of the rigidity of the platforms carried by the vertical lifts of the prior art, limitations are placed in the directions travelled by the platform. This obviously restricts the uses to which the vertical lifts may be put. Also, none of the existing vertical lift type loading systems or elevators supply a cantilever motion to adjust to different locations of the loading or unloading station.

SUMMARY OF THE INVENTION

Accordingly, it is an object of the present invention to provide a transport device which overcomes the above-mentioned disadvantages of the prior art.

It is also an object of the present invention to provide a transport system which is adjustable in its vertical and horizontal dimensions and which is of unique and simple construction and susceptible of automatic operation.

It is still another object of the present invention to provide a transport device which includes a unique platform construction and chain drive system which makes it possible for one power source to move the platform continuously in any desired direction.

These and other objects are accomplished by the transport device of the present invention which comprises a plurality of pivotally connected support bars which define a support frame. At least two pairs of offset and movable endless flexible support members are supported by the frame and the support members are guided coextensively in a first direction by a first plurality of guide members. A second plurality of guide members guide one pair of the support members in a second direction back to the first plurality of guide members and third and fourth pluralities of spaced guide members guide the first and second pairs of support members, respectively, in a third direction to the first plurality of guide members and to the second plurality of guide members. Also provided is a reversible drive mechanism operatively coupled to the support members for moving the support members in either a first direction or a second direction.

In one preferred embodiment of the invention, the vertical lift device is permanently attached to a truck, replacing the loading gate of the truck, and, in a second preferred embodiment, the device is permanently installed in a truck dock.

In another embodiment, a multiple chain system for loading aircraft is shown which is fully adjustable at both the loading and unloading stations and the upper loading station thereof adjacent the aircraft has two completely independent adjustable features which make it possible for the device to continuously follow the roll and pitch of the aircraft during the operation of the chain system. The platform of the system comprises a plurality of independent platforms which move together to form one loading table. The multiple narrow platforms of the loading table move together during vertical and horizontal transportation movement and simply break up into units when the chain goes around drive members. This unique feature makes it possible to combine many lifting and transporting units into one continuous system combining numerous vertical and horizontal movements into one continuous flow.

BRIEF DESCRIPTION OF THE DRAWING

In the Drawings:

FIG. 3 illustrates a sequence of loading operations carried out by the transport device truck attachment shown in FIG. 1;

FIG. 4 is a side elevational view of a typical permanently installed, transport device arranged according to the present invention;

FIG. 14 illustrates schematically still another embodiment of a transport device for bridging obstacles and the like.

DESCRIPTION OF THE PREFERRED EMBODIMENTS

Figure 1:
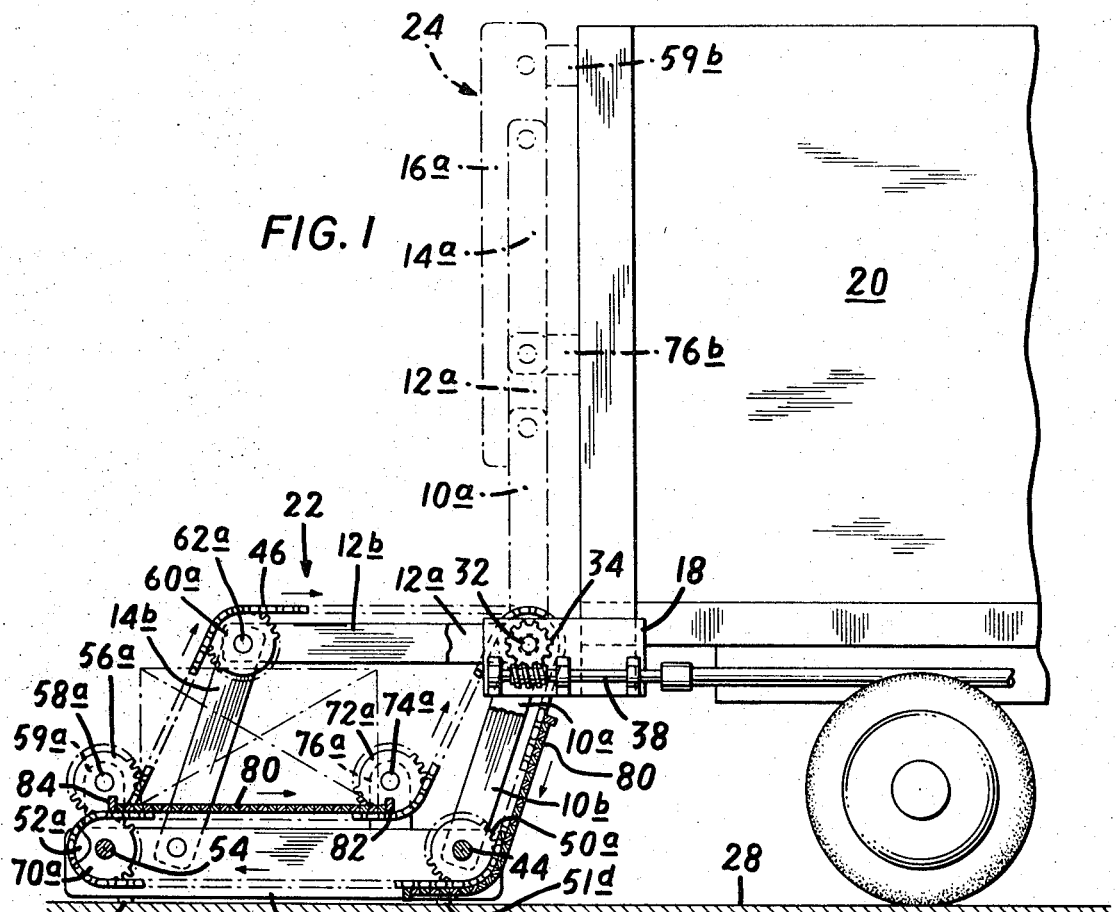
FIG. 1 is a side elevational view of a typical transport device attachment for trucks arranged according to the present invention.
Figure 2:
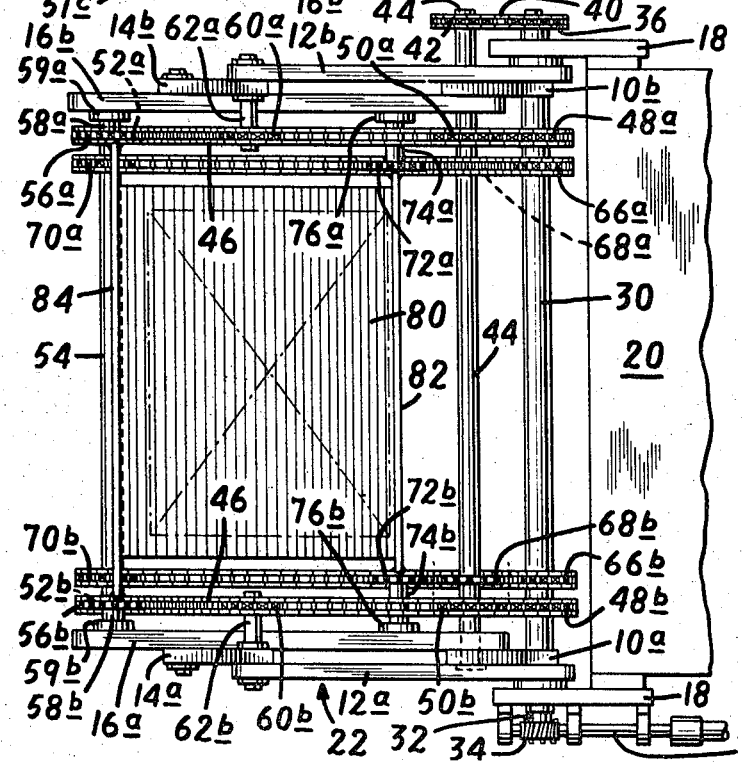
FIG. 2 is a fragmentary top plan view of the transport device truck attachment illustrated in FIG. 1.

In an illustrative transport device attachment for trucks arranged according to the present invention, as shown in FIGS. 1—3, a plurality of support arms 10a, 12a, 14a and 16a, pivotally connected at their ends, are secured to one edge of the frame 18 of a truck 20 and define one-half a support frame 22. As shown in FIG. 2, the other half of the support frame 22 is defined by a corresponding plurality of pivotally connected support arms 10b, 12b, 14b and 16b secured to the other side of the truck frame 18.

As shown by the broken lines 24 in FIG. 1, the support arms 10a, 10b, 12a, 12b, 14a, 14b and 16a, 16b are retained in generally upright positions against the frame 18 of the truck 20 in any conventional manner, replacing the typical loading platform or gate of the truck, until a loading or unloading operation is set to being. Then, a connection between the support arms and the truck frame 18 is opened to drop the frame 22 from the truck onto a truck dock 28. Because of the pivotal connection between the support arms of the frame 22, the configuration of the assembled frame 22 will depend upon the displacement between the truck frame 18 and the dock 28. Specifically, where the displacement is less than the longitudinal dimension of the support arms 10a and 10b, the frame 22 takes on the angular appearance which is shown in FIGS. 1 and 3. Where the displacement equals the longitudinal dimension of the support arms 10a and 10b, the arms will intersect the laterally extending arms 12a, 12b; 16a and 16b at an angle of 90° degrees and the frame 22 will have a generally square-shaped configuration.

Referring to FIG. 2, the ends of the support arms 10a, 10b; 12a, 12b pivot about a rod 30 enclosing a drive shaft 32 which is terminated at its opposite ends by a worm gear 34 and a sprocket 36. Coupled to the worm gear 34 is a drive shaft 38 which is driven in either direction at a constant angular velocity by a driving member (not shown) such as a reversible motor or a power takeoff mounted in the truck 20. To achieve improved driving action, the sprocket 36 is coupled via an endless loop chain 40 to a sprocket 42 which, in turn, drives a shaft 44 extending between the opposite ends of the support arms 10a and 10b and the opposite ends of the support arms 16a and 16b.

Defining a firs endless loop for a first outwardly disposed endless chain pair 46 are a pair of horizontally displaced sprockets 48a and 48b mounted on the drive shaft 34 and a pair of similarly displaced sprockets 50a and 50b mounted on the drive shaft 44. The vertical displacement between the sprockets 48a and 50a, 48b and 50b depends upon the height of the truck frame 18 relative to the truck dock 28. As shown, the support arms 16a and 16b have formed therein protrusions 51a, 51b, 51c and 51d, which engage the surface of the truck dock 28 and accordingly, raise the elevation of the frame 22 to a small extent.

Spaced laterally to the left of the sprockets 50a and 50b are sprockets 52a and 52b which are mounted on and rotatable about a rod 54 secured at its opposite ends to the other ends of the support arms 16a and 16b. A pair of sprockets 56a and 56b pivot about a pair of rods 58a and 58b, respectively, extending from upstanding flanges 59a and 59b formed in the support arms 16a and 16b and direct the endless chain pair 46 upwardly to a pair of sprockets 60a and 60b. The sprockets 60a and 60b are mounted on rods 62a and 62b respectively which extend inwardly from the support arms 12a and 12b and also define a pivot point between the support arms 12a, 12b and the support arms 14a, 14b, respectively. As shown, the sprockets 60a and 60b lie in the same vertical plane with the sprockets 48a and 48b, and accordingly, the endless chain pair 46 extends laterally from the sprockets 60a and 60b to the sprockets 48a and 48b.

Defining a second endless loop for a second inwardly disposed endless chain pair 64 are a pair of spaced sprockets 66a and 66b mounted on the drive shaft 32. It can be seen that the two endless chain pairs 46 and 64 are coextensive at the start of the loading operation which begins at the sprockets 48a, 48b and 66a and 66b. Form the sprockets 66a and 66b, the chain pair 64 is guided downwardly to a pair of sprockets 68a and 68b mounted on the drive shaft 44. Thereupon, the chain pair 64 is guided laterally in a first vertical plane to a pair of spaced sprockets 70a and 70b mounted on the shaft 54 which extends between the support arms 16a and 16b. Accordingly, the endless chain pairs 46 and 64 remain coextensive in their travel until reaching the sprockets 56a, 56b and 70a, 70b, respectively.

The endless chain pair 64 then travels laterally to the right in a second vertical plane to a pair of sprockets 72a and 72b mounted on rods 74a and 74b which extend inwardly from a second pair of upstanding flanges 76a and 76b formed on the support arms 16b and 16a, respectively. The sprockets 72a and 72b guide the second endless chain pair 64 upwardly to the sprockets 66a and 66b mounted on the drive shaft 32.

As best illustrated in FIG. 1, the lateral displacement between the sprockets 56a, 56b which guide the first endless chain pair 46 upwardly and the sprockets 72a, 72b which guide the inner endless chain pair 64 upwardly is determinative of the required longitudinal extent of a load carrying platform which is conveyed by the endless chain pairs 46 and 64. Specifically, a platform 80, which may be of flexible construction, includes laterally extending forward and rearward support flanges 82 and 84 respectively which are received and retained by the endless chain pairs 64 and 46, respectively.

The distance between the forward and rearward flanges 82 and 84 equals the displacement between the sprockets 56a, 56b and 72a and 72b. As particularly shown in FIG. 1, this is necessary to make certain that the platform is maintained in a horizontal position as it is carried by the chains 46 and 64 upwardly or downwardly.

In operation and with particular reference to FIG. 3, the truck 20 is backed into a loading station and the support frame 22 disconnected from the truck frame 18 and dropped from the truck to a position where at the support arms 16a and 16b rest against the dock 28. For a loading operation, such as the type shown in FIG. 3, unit loads of material 84a–84n are loaded from the platform rollers 86 onto the truck 20 in the following manner:

A number of platforms 80 are mounted on the endless loop chains 46 and 64 such that, at the time a unit load of material 84d is being deposited onto the truck 20, a unit load of material 84e is set for engagement with a second platform. Specifically, the worm gear 34 is driven in the appropriate direction by the drive shaft 30 to implement the clockwise rotation of the drive shafts 32 and 44 (FIG. 2). As each platform 80 moves toward the platform rollers 86, each unit load of material is transferred onto the platform and the platform transports the load at first laterally between sprockets 56a, 56b and 72a, 72b and then upwardly to the sprockets 60a, 60b and 66a, 66b. Thereafter, the platform moves laterally to deposit each unit load onto the truck. As shown, the truck 20 may comprise rollers to facilitate the transfer of the unit loads from the platforms 80 to the truck.

To unload unit loads of material from the truck, the drive shaft 38 in the truck is driven in a reverse direction to implement a counterclockwise rotation by the drive shafts 32 and 44 respectively. In this operation, the unit loads of material are transferred from the truck 20 by depositing the unit loads onto the platforms 80 as the platforms move from the lower sprockets 50a, 50b, and 68a, 68b to the upper sprockets 48a, 48b and 66a and 66b, respectively. The unit loads are then conveyed laterally to a position between the sprockets 66a and 66b and the sprockets 60a, 60b and thence downwardly to a position between the sprockets 72a, 72b and the sprockets 56a, 56b. Thereafter, the unit loads are transferred from the platforms 80 to the platform rollers 86.

In the illustrative permanently installed vertical lift device arranged according to the present invention, as shown in FIG. 4, the connections between the support arms 100a, 100b; 102a, 102b; 104a, 104b, and 106a, 106b of the support frame 108 are pivotal such that the overall height of the frame 108 can be adjusted to suit any particular truck. In this particular embodiment, the frame 108 is mounted in a truck bed 110 and the elongated lower support arms 106a, 106b are supported on springs 112a, 112b, 112c and 112d, respectively.

By elongating the support arms 106a and 106b, there is substantial lateral movement by the platforms 114 which are secured at their forward and rearward edges to the inwardly and outwardly disposed endless loop chain pairs 116 and 118, respectively. In particular, the guide sprockets 120a, 120b and 122a, 122b (only sprocket 120a being shown) for the chain pairs 118 and 116 are located at the ends of the support arms 106a, 106b and are laterally spaced from the guide sprockets 124a and 124b and are laterally spaced from the guide sprockets 124a and 124b for the outwardly disposed chain pair 118 by a substantial distance. Preferably, the platforms 114 move laterally an extended distance which is at least as great as the distance between the forward and rearward edges thereof, i.e., the distance between the guide sprockets 124a, 124b and the guide sprockets 126a, 126b for the chain pair 116.

As shown by the broken lines 128, to accommodate different truck sizes the support frame 108 is adjustable such that the overall configuration may vary from the illustrated generally square-shaped configuration to a generally angular configuration. Accordingly, the permanently installed vertical lift device of the instant invention need not be specifically designed to suit any particular installation. Rather, the lift device may be adjusted after installation to accommodate the different vertical dimensions that may exist between the loading dock 110 and a truck or loading platform.

Figure 6:
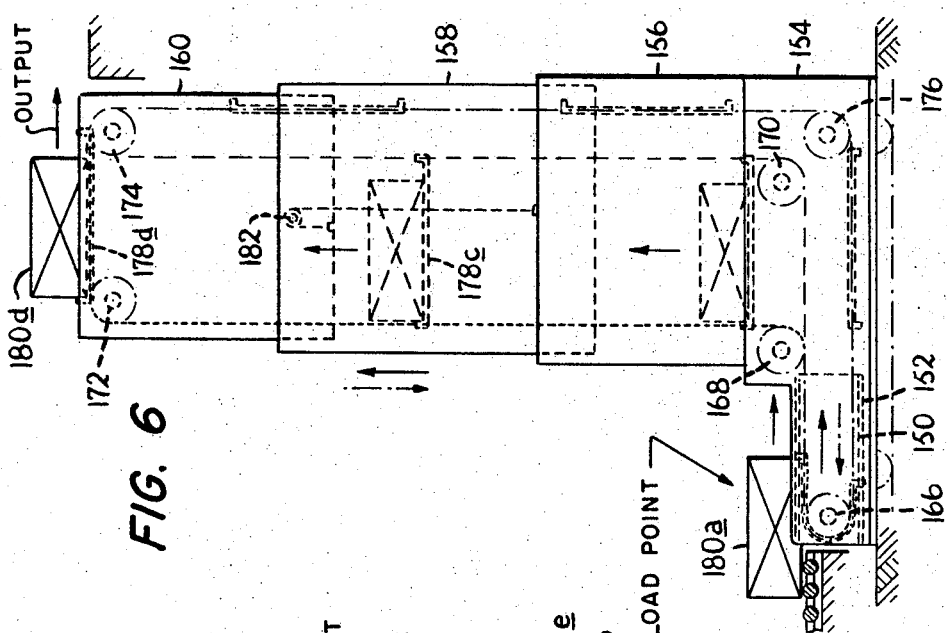
FIGS. 5 and 6 illustrate schematically a telescoping transport device in two operative positions arranged according to the present invention.
Figure 5:
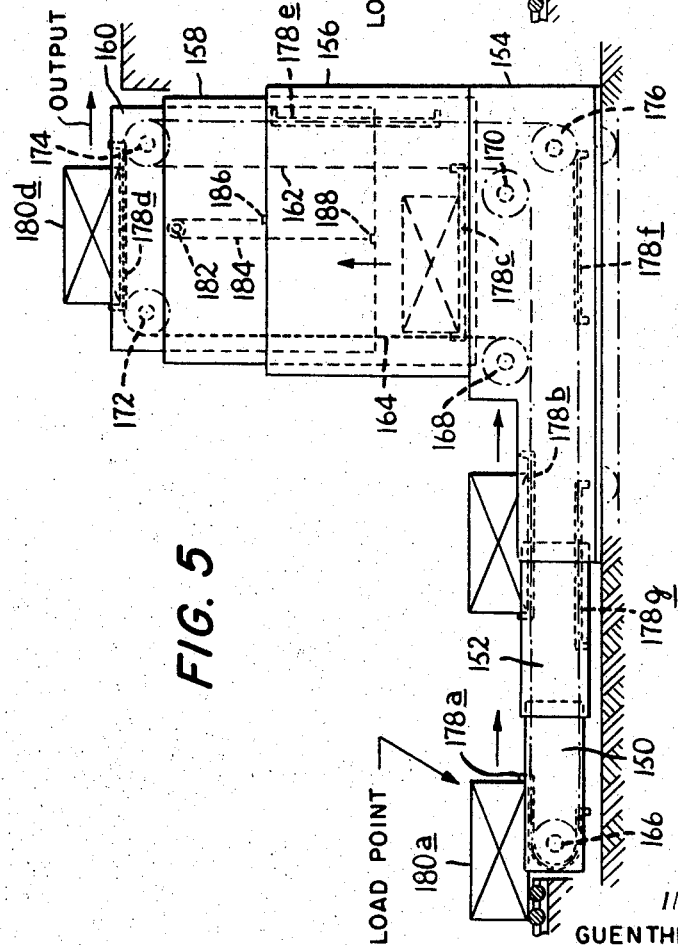

In the illustrative transport device arranged according to the present invention as shown in FIGS. 5 and 6, a double telescoping transport device includes a first horizontal frame section 150, a second horizontal frame section 152 adapted to telescopically receive the first section 150 and a stationary housing member 154 adapted to telescopically receive the second section 152. Mounted on the stationary housing member 154 is a stationary frame section 156 which is adapted to telescopically receive a first vertical frame section 158. A second vertical frame section 160 is adapted to be telescopically received by the first vertical frame section 158.

The arrangement of the chain system and chain drive therefor in the transport device illustrated in FIGS. 5 and 6 corresponds to the arrangement of the chain system and chain drive therefor illustrated in FIGS. 1 through 4 and, accordingly, need not be described in detail hereinafter. It suffices that the chain system comprises two pairs of inwardly and outwardly disposed endless loop chain pairs 162 and 164 which are guided and driven by suitably situated sprockets. Specifically, there are mounted in the horizontal frame section 150 two pairs of drive sprockets 166 for driving the chain pairs 162 and 164 in a horizontal direction, one pair of sprockets 168 mounted in the housing member 154 for guiding the outer chain pair 164 upwardly and a pair of guide sprockets 170 for guiding the inner chain pair 162 upwardly. Further provided are guide sprockets 172 mounted in the second vertical frame section 160 for guiding the outer chain pair 164 in a horizontal direction and two sets of guide sprockets 174 mounted in the section 160 for guiding the inner and outer chain pairs downwardly to two sets of corresponding guide sprockets 176 mounted in the stationary housing 154.

Again a plurality of spaced platforms 178a–178g are mounted between the endless loop chain pairs 162 and 164 such that, at the time a unit load of material 180a is being loaded onto the platform 178a, a unit load of material 180a is being deposited onto an unloading platform or an output station.

Mounted on the first vertical section 158 is a guide member 182 which may be, for example, a sprocket and which receives a coupling member 184 which may be, for example, a chain. At its opposite ends 186 and 188, the chain 184 is secured to the stationary frame 156 and to the second vertical section 160, respectively. The first section 158 is coupled to retain in a predetermined fixed vertical position within the stationary housing member 156 by a drive member (not shown) which may, for example, be an hydraulic lifter. When driven upwardly through the housing member 156 by the drive member (not shown) the section 158, by virtue of the coupling chain 184, carries with it the second vertical section 160.

Because of the tautness of the chain pairs 162 and 164, the upward movement by the vertical sections 158 and 160 causes the concurrent telescoping of the horizontal frame sections 150 and 152. Accordingly, when the vertical sections 158 and 160 have reached their maximum heights, as shown in FIG. 6, the horizontal sections 150 and 152 are telescoped fully within the section 152 and stationary housing member 154, respectively. Conversely, when the sections 158 and 160 are driven downwardly, the pressure by the chain pairs 162 and 164 will force the sections 150 and 152 to move laterally the maximum lateral position, as indicated in FIG. 5.

Figure 7:
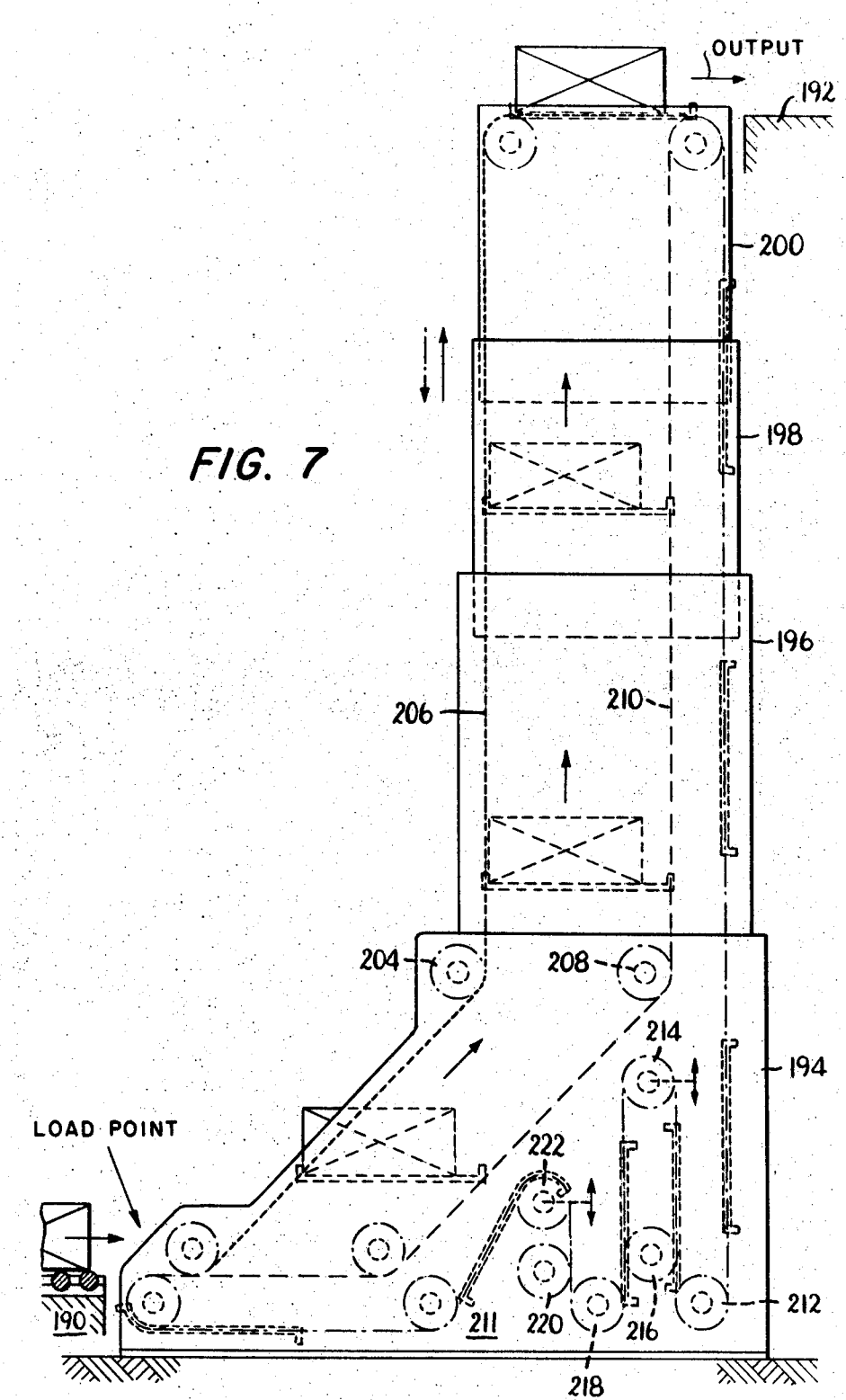
FIG. 7 illustrates schematically another embodiment of a telescoping transport device arranged according to the present invention.

In the illustrative transport device arranged according to the present invention, as shown in FIG. 7, a modified telescoping transport device is provided which will accommodate variable differences in height between a loading station 190 and a load discharging or output station 192. The transport device comprises a stationary housing member 194, a support member 196 mounted on the housing member 194 and a pair of vertical sections 198 and 200 adapted to be received telescopically in the section 196 and the section 198, respectively.

The structure and operation of the transport device is generally similar to that of the transport device illustrated in FIGS. 5 and 6 except that only a vertical telescoping arrangement is provided in the FIG. 7 embodiment. Also, there are provided a pair of sprockets 204 mounted in the housing member 194 for guiding an outer chain pair 206 upwardly and a pair of chain sprockets 208 mounted in the member 194 for guiding an inner chain pair 210 upwardly through the transport device.

In addition, in order to maintain the tautness of the chain pairs 206 and 210 during the various changes in height of the transport device, the housing 194 is provided with a magazine section 211 which includes a plurality of spaced guide sprockets 212, 214, 216, 218, 220 and 222. As shown, the sprockets 214 and 222 are vertically movable in directions which oppose the movement by the telescoping sections 198 and 200. Specifically, as the telescoping sections 198 and 200 are driven upwardly to bring the device to its fullest vertical extend, the sprockets 214 and 222 are forced downwardly to decrease the extent of travel by the chain pairs 206 and 210 in the magazine section 211. As the sections 198 and 200 are telescoped into the sections 196 and 198, respectively, the sprockets 214 and 222 are forced upwardly to compensate for the decrease in chain run by adding to the chain run in the magazine section 211.

Thus far, there have been described transport devices which includes platforms of unitary construction and flexible in only one direction, for conveying unit loads of material between a loading platform and an unloading platform. These platforms may include rigid transverse members, such as, for example, rectangularly shaped metal strips, tubes, rods or the like coupled together by longitudinally extending supports which are, in turn, connected to the two offset chain pairs. The transverse members may be separated by small distances or connected together in tongue and groove fashion. Such platforms "flex" in one direction, e.g., upwardly and, accordingly, the platform will bend around the various drive and guide sprockets in the transport devices. At the same time, the platforms will not flex in the opposite direction, e.g., downwardly, and this enables the platforms to carry unit loads of material upwardly and laterally through the transport device.

Because of the above-described structures of the platforms, maximum stress is placed on the corners of the platform when the unit load of material is placed thereon. In addition, the unidirectional flexibility of the platforms limits the directions in which the platforms may be transported and accordingly, limits the configurations of the transport devices.

Figure 8:
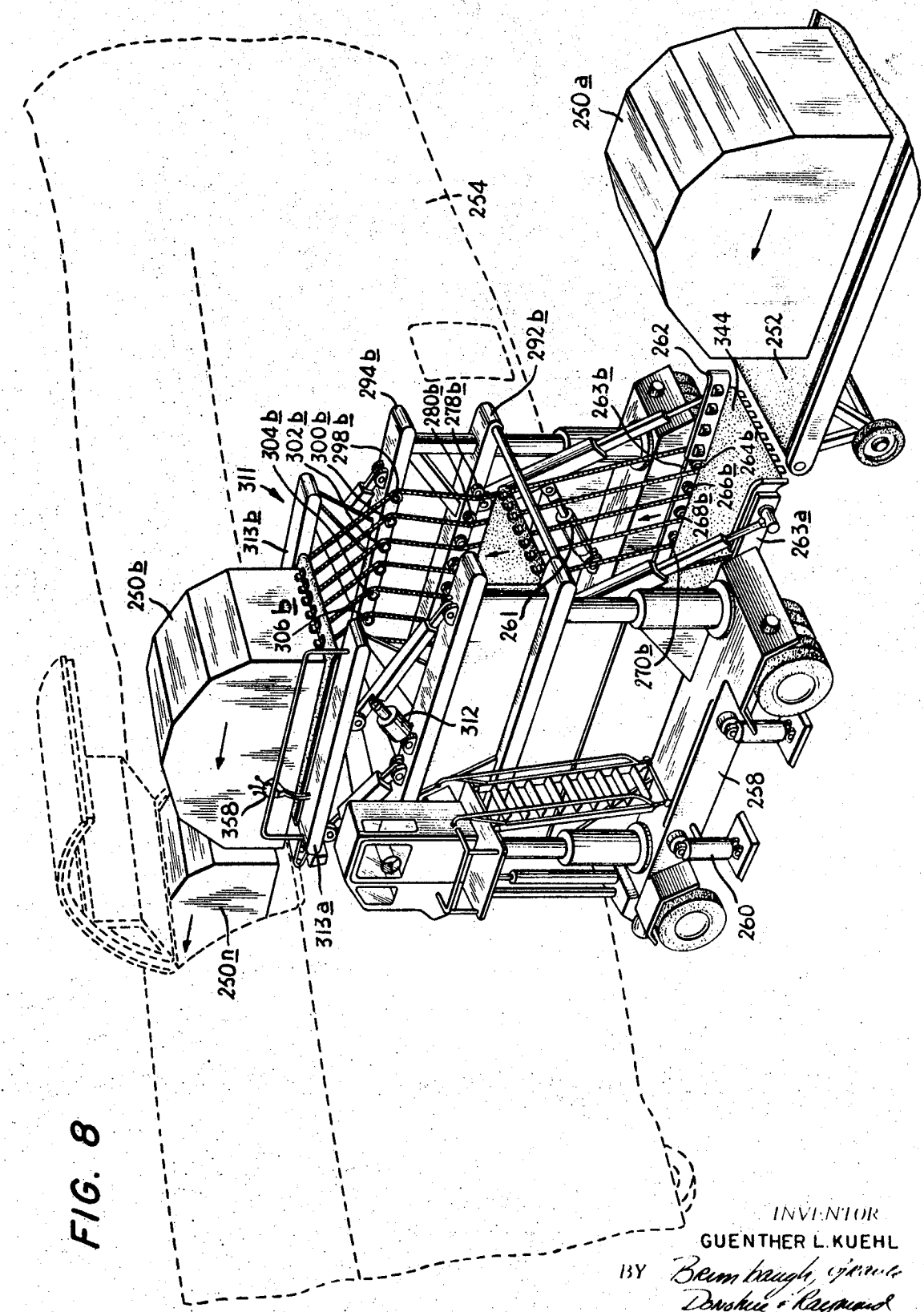
FIG. 8 illustrates perspectively a transport device for aircraft and the like carriers arranged according to the present invention.
Figure 9:
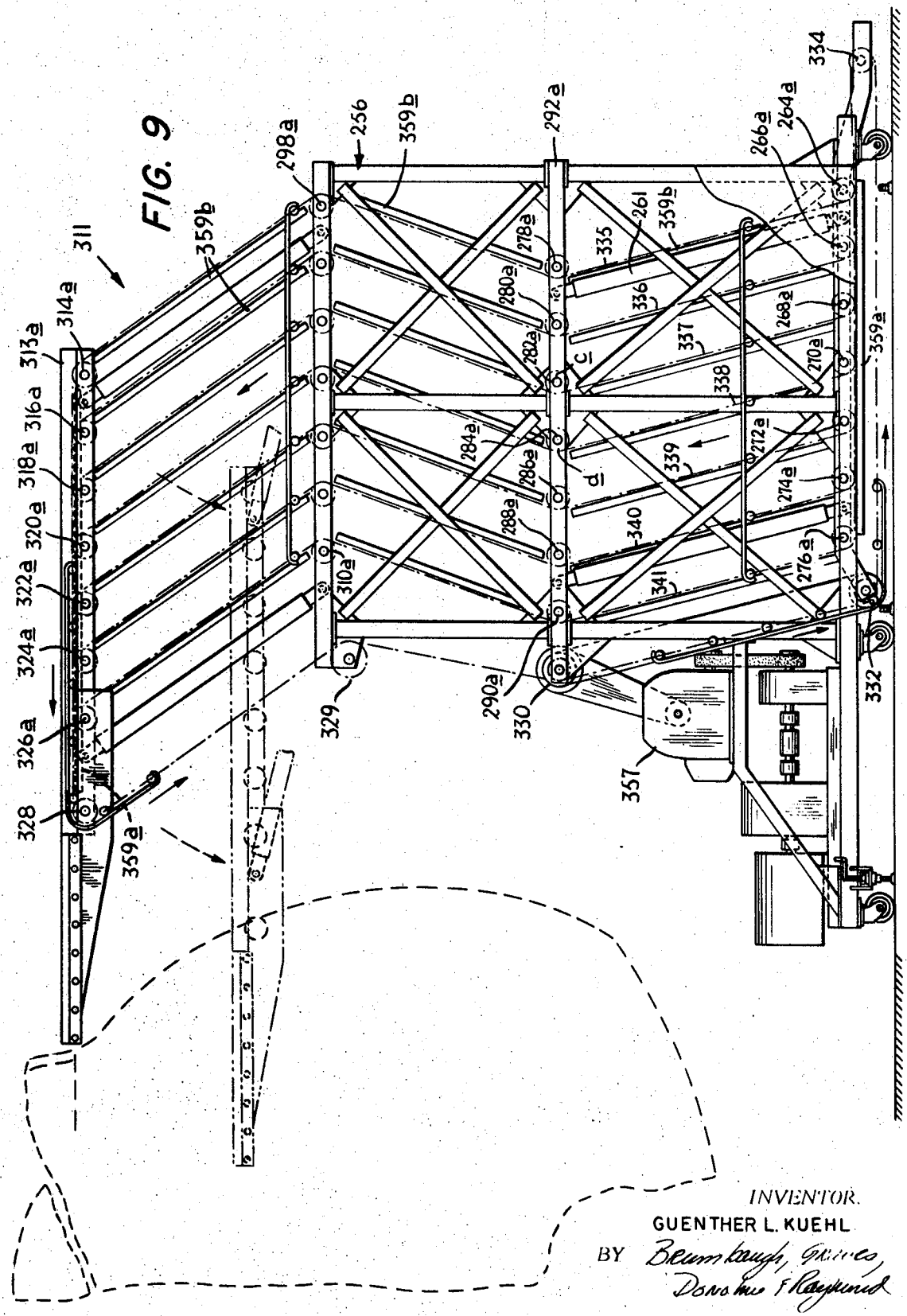
FIG. 9 ILLUSTRATES SCHEMATICALLY THE TRANSPORT DEVICE IN FIG. 8.

This limitation in directivity of movement is overcome in accordance with the present invention by the unique and novel chain system and chain drive therefor embodied in the transport device illustrated in FIGS. 8—12 of the drawings. As illustrated in FIGS. 8 and 9, there is provided a fully adjustable transport device for loading unit loads of material 250a—250n from a platform 252 into the cargo area of an aircraft 254. The transport device comprises a fixed frame 256 mounted on a carriage 258 which is retained in a fixed position adjacent the aircraft 254 by a plurality of jacks 260.

Pivotally supported by a plurality of hydraulic cylinders 261 within the lower half of the frame 256 and, therefore, having a variable height, is a lower frame 262 for the chain system of the instant invention. Mounted on the longitudinally extending lower rigid support bars 263a and 263b of the frame 262 are seven sets of longitudinally spaced and offset drive sprockets 264a, 264b; 266a, 266b; 268a, 268b; 270a, 270b; 272a, 272b; 274a, 274b; and 276a, 276b. As viewed in FIG. 8, the sprockets 264a, 264b...276a, 276b are mounted on corresponding bearing wheels which project transversely of the rigid bars by incrementally increased distances. Specifically, the sprockets 264a and 264b project into the area between the support bars by the least amount and therefore support an outermost chain pair and the sprockets 276a, 276b project into the area between the bars by the greatest amount and therefore are adapted to support an innermost chain pair.

A plurality of corresponding sets of sprockets 278a, 278b; 280a, 280b; 282a, 282b; 284a, 284b; 286a, 286b; 288a, 288b; and 290a, 290b, are mounted on the longitudinally extending central bars 292a and 292b of the rigid support frame 256. Mounted on the longitudinally extending upper bars 294a and 294b of the frame 256 are a plurality of corresponding sets of sprockets 298a, 298b; 300a, 300b; 302a, 302b; 304a, 304b; 306a, 306b; 308a, 308b; and 310a, 310b. Hydraulically supported on the upper bars 294a and 294b of the support frame 256 is a collapsible frame 311 for guiding a unit load of material to the cargo area of the aircraft 254.

As shown a plurality of intersecting hydraulic cylinders 312 support the upper frame 311 in any desired angular configuration such that the upper support bars 313a and 313b of the frame are parallel with the cargo inlet area of the aircraft 254. Mounted on the support bars 313a and 313b are seven sets of longitudinally spaced and offset drive sprockets 314a, 314b; 316a, 316b; 318a, 318b; 320a 320b; 322a, 322b; 324a, 324b; and 326a, 326b, only the a sprockets being shown. The sprockets 314a—326b guide the seven sets of offset chain pairs to be described hereinafter, to a corresponding plurality of sets of guide sprockets 328. The guide sprockets 328 operate to guide the seven chain pairs with which they are engaged downwardly, as will be explained hereinafter.

As best seen in FIG. 9, seven sets of aligned and notched sprockets 329 mounted on the rigid support frame 256 guide the seven sets of offset chain pairs downwardly. Vertically displaced from the seven sets of sprockets 328 and mounted on the central support bars 292a and 292b of the rigid frame 256 are seven further sets of drive sprockets 330. Similarly mounted on the longitudinally extending lower support bars 263a and 263b of the rigid frame 256 are seven sets of guide sprockets 332 and displaced therefrom and mounted on the laterally extending end portion of the frame 262 are seven sets of guide sprockets designated by the numeral 334.

Further provided are seven sets of offset endless chain pairs 335, 336, 337, 338, 339, 340 and 341. Each chain pair is guided in the same direction and, accordingly, only the path of travel by the endless chain pair 335 will be described herein. Specifically, the outermost endless chain pair 335 is guided upwardly by the sprockets 264a and 264b mounted on the frame 256 to the sprockets 278a and 278b. Thereupon, the chain pair is guided at an acute angle upwardly across the sprockets 298a and 298b to the guide sprockets 314a and 314b. The sprockets 314a and 314b guide the chain pair 335 laterally to the axially aligned sprockets 328. These sprockets guide the chain pair downwardly to two of the notched guide sprockets 329 which, in turn, guide the sprockets downwardly and obliquely to the drive sprockets 330. From the guide sprockets 330, the chain pair travels downwardly to the guide sprockets 332 and then laterally to the guide sprockets 334.

Figure 10:
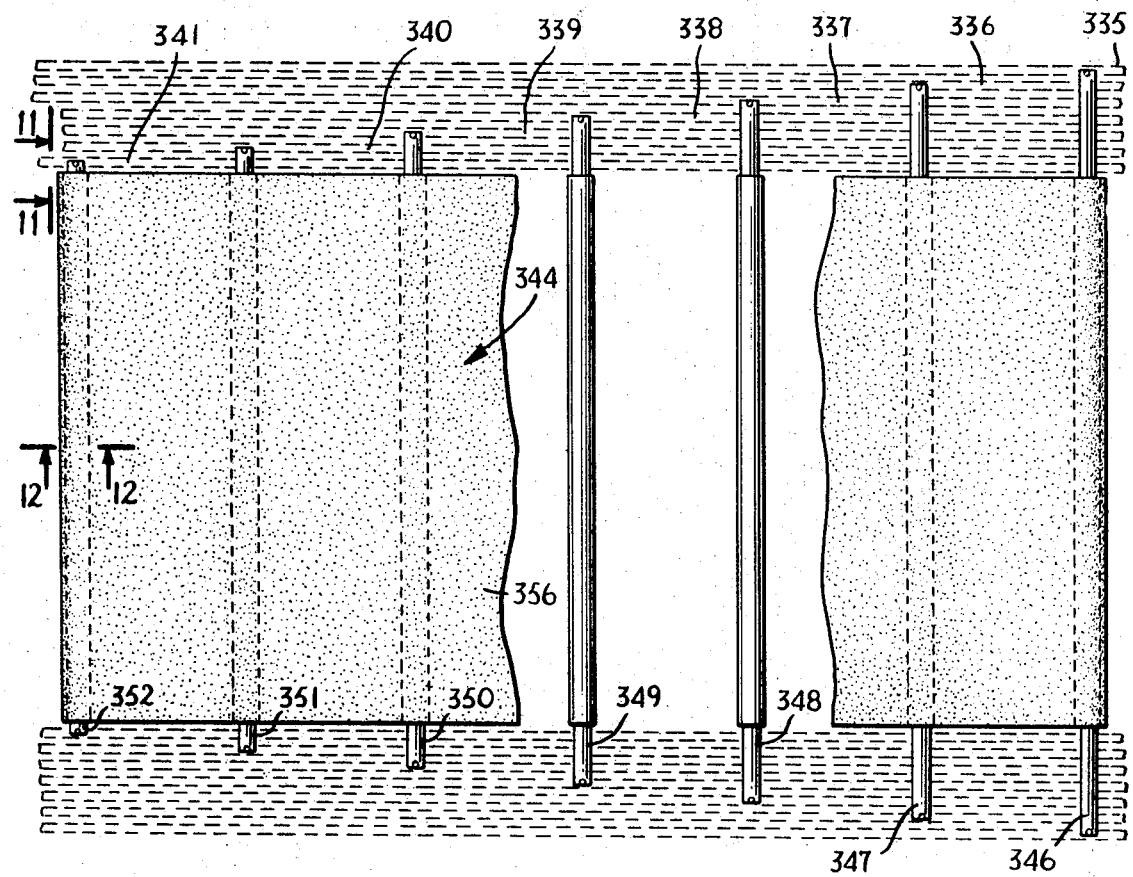
FIG. 10 is a plan view, partly broken away, of a typical platform carried by the chain system of the FIG. 8 transport device.
Figure 11:
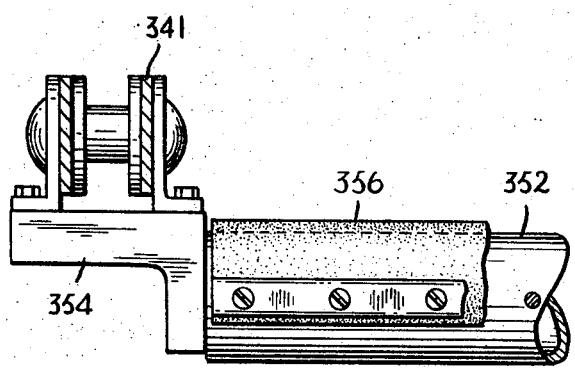
FIGS. 11 and 12 are sectional views of the chain system and the platform carried thereby taken along lines 11–11 and 12–12 of FIG. 10 and looking in the direction of the arrows.

As best shown in FIG. 10, the platform 344 of the instant invention comprises seven tube members 346, 347, 348, 349, 350, 351 and 352. Each tube member is attached to an endless chain pair. For example, tube member 346 is attached to the outermost chain pair 335 and the tube member 352 is attached to the innermost endless chain pair 341. As best shown in FIG. 11, the tube members 346—352 are attached to their respective chain pairs 335—341 through angle members. Tube member 352 is illustrative and is attached to its chain pair 341 via an angle member 354. In this manner, there will be no interference between the tube members 346—352 and adjacent chain pairs and sprockets, the tube members extending either over or under the adjacent chain pairs.

Figure 12:
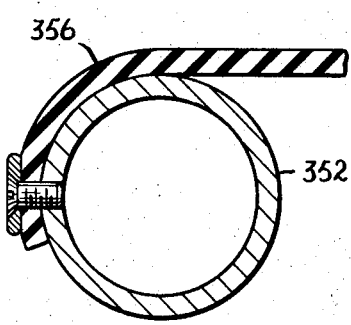

Although the tube members done may serve as a platform, preferably a resilient sheet 356 is attached to the first and seventh tube members 364 and 352 via rivets or the like, as shown in FIG. 12. The sheet material which may, for example, be formed of rubber has a width which corresponds to the displacement between the innermost chain pairs 341 as may be understood in the art. By providing a platform consisting of individual elements coupled to associated chain pairs, applicant provides a platform device which is rigid so long as the elements are aligned and which is, at the same time, capable of movement on any direction. For example, a unidirectionally rigid conventional platform could not make the turns required at the sprockets 298a, 298b—310a, 310b mounted on the frame 256 or make the turns around the sprockets 329.

In order to drive the chain system, the sprockets 330 are keyed to a belt driven shaft which is, in turn, driven by a motor 357. A control panel 358 mounted on the collapsible support frame is also provided to control the vertical dimensions of the transport device by controlling the intersecting hydraulic cylinders 312 and 261 and to control the energization of the chain drive system. To accommodate heavy loads, seven sets of offset and stationary lateral and vertical guides 359a and 359b respectively, may be provided to supply support for the chain pairs and to reduce lateral vibration by the offset chain pairs.

The operation of the transport device illustrated in FIGS. 8-—12, as initiated by actuating the appropriate controls on the control panel 358. Once the motor 357 is energized, unit loads of material 250a may be placed onto the platforms 344 as each platform makes the turn around the sprockets 334. The unit load of material supported by the platform 344 is the transported upwardly by the plurality of chain pairs 335—341 through the rigid frame 256 and the collapsible frame 311 and then horizontally to deposit the unit load (250b) into the aircraft 254. It will be noted that the transport device of the present invention may be continuously operated and that the support frame 262 may be adjusted to accommodate different platform vertical heights during such continuous operation. In addition, the collapsible frame 311 may also be adjusted during the operation of the device in order to accommodate the height of the cargo inlet of the aircraft 254 which varies as the weight of the cargo loaded into the plane varies. Accordingly, the transport device may be continuously operated and accommodate different vertical heights for the cargo inlet and different vertical heights for the loading platform 252.

Figure 13:
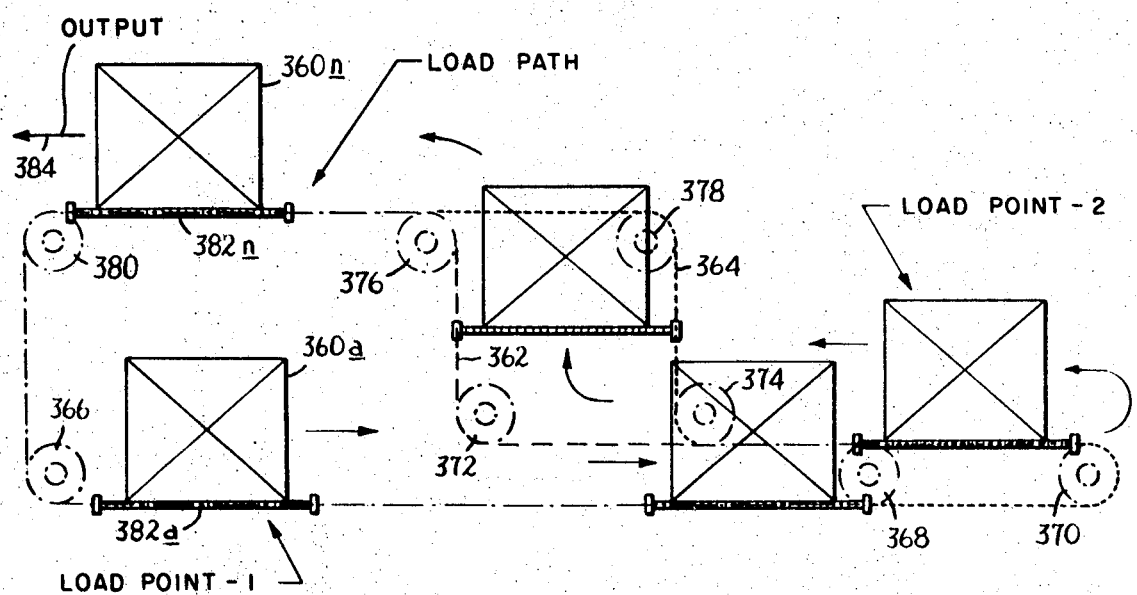
FIG. 13 illustrates another embodiment of a transport device for conveying unit loads of material between three stations.

Referring now to FIG. 13 there is shown an inverted transport system especially adapted for use in the loading and the unloading of unit loads in a warehouse. There are provided a pair of load points for unit loads of material 360a—360n. The chain drive for the system comprises two sets of inner and outer endless chain pairs 362 and 364, although multiple chain pairs of the type included in the FIG. 8 transport device may be provided where increased direction mobility is required. The chain pairs 362 and 364 are guided in the lateral direction by a plurality of sprockets 366 to two sets of offset sprockets 368 and 370, respectively. Due to the fact that the sprockets 368 and 370 engage the inner and outer chain pairs 362 and 364, respectively, the chains are transported vertically thereby.

From the sprockets 368 and 370, the chain pairs 362 and 364 are guided laterally to two sets of laterally spaced sprockets 372 and 374, respectively. These sprockets direct the chain pairs 362 and 364 upwardly to corresponding sets of sprockets 376 and 378 which, in turn, guide the chain pair laterally to a plurality of guide sprockets 380. Mounted on the offset endless loop chains 362 and 364 are a plurality of spaced platforms 382a—382n which support the unit loads of material 360a—382n which support the unit loads of material 360a—360n, respectively. If a multiple chain pair system of the type illustrated in FIG. 8 were to be utilized in the chain drive system of FIG. 13 the platforms 382a—382n would comprise individual components, each coupled to a selected chain pair as above described.

In operation, unit loads of material 360a—360n may be deposited onto the platforms 382a—382n either at the load point 1 or the load point 2 and thereafter be conveyed to the output platform indicated by the arrow 384. The configuration illustrated in FIG. 13 is particularly suitable for warehouses and the like storage units in that loads of material may be continually loaded from two different sources, e.g., trucks, and yet be deposited at the same output. Conversely, if the chain drive system were to be driven in reverse, unit loads of material loaded from the output loading platform may be deposited either at the load point 2 or the load point 1.

Figure 14:
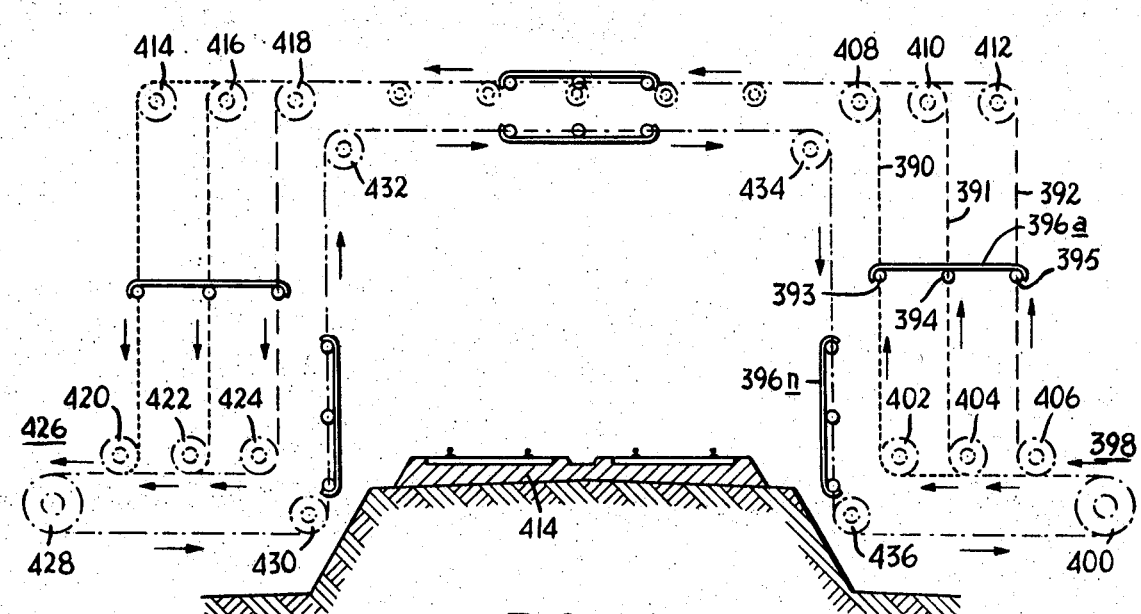

Referring to FIG. 14 there is illustrated a transport device which is especially adapted to convey people or material across obstacles, such as, for example, railroad tracks and streets. The device comprises three pairs of offset endless loop chains 390, 391 and 392 to which are attached tube members 393, 394 and 395, respectively, which form the platforms 396a—396n of the device. To transport the platforms from the area indicated by the numeral 398, three sets of offset drive sprockets indicated by the numeral 400 are provided. These guide sprockets drive the endless loop chain pairs to three sets of sprockets 402, 404 and 406 which direct the chains 390, 391 and 392 upwardly to a corresponding plurality of guide sprockets 408, 410 and 412, respectively. From the sprockets 408, 410 and 412 the chain pairs 390, 391 and 392 are directed laterally across an obstacle, here shown as railroad tracks 414, to corresponding pairs so sprockets 414, 416 and 418, respectively. These sprockets direct the chain pairs 390, 391 and 392, respectively, downwardly to corresponding sets of sprockets 420, 422 and 424. At the point designated by the numeral 426, the people or the unit loads of material may be deposited. At the deposit point 426, there are provided three sets of sprockets 428 which guide the three chain pairs 390, 391 and 392 laterally to a plurality of sprockets 430. From the sprockets 430, the chain pairs are directed upwardly across three sets of sprockets 432 and thence laterally to a plurality of sprockets 434. Thereupon, the chain pairs are guided downwardly to a plurality of sprockets 436.

In view of the foregoing, it can be seen that the platforms 396a—396n will be conveyed by the chain pairs 390, 391 and 392 across the obstacle 414 and downwardly, once the obstacle has been traversed, in order to deposit individuals or unit loads of material at the unloading station 426. Although the platforms are here shown as comprising three tube members, it will be understood that as many tube members, together with associated chain pairs, may be provided to accommodate increased number of individuals of larger loads of material.

Although the invention has been described herein with reference to specific embodiments, many modifications and variations therein will readily occur to those skilled in the art. For example, all the sprockets, except for the drive sprockets, disclosed in the various embodiments of the invention may be replaced by plain discs and the like. Also, stationary guide supports mounted between the spaced sprockets may be provided to supply support for the chain pairs and the reduce lateral vibration by the platforms carried by the chain pairs. Accordingly, all such modifications and variations are included within the intended scope of the invention as defined by the following claims.

I claim:

1. A transport device comprising a frame member, said frame member comprising a first collapsible section, a second stationary section and a third collapsible section arranged in superposed relationship, a plurality of offset and movable pairs of endless flexible support members supported in their travel by the frame member, a first plurality of offset pairs of guide members for maintaining the flexible support members coextensive and for guiding the support members upwardly through said first, second and third superposed sections, a second plurality of spaced offset pairs of guide members mounted in the third collapsible section and engaging selected pairs of support members for guiding the support members in a lateral direction, a third plurality of offset pairs of offset guide members mounted on the first, second and third sections for guiding the support members to the first plurality of offset pairs of guide members, and platform means, the platform means comprising a plurality of spaced rigid linear members, each member being connected at its ends to one pair of said movable endless support members.

2. A transport device according to claim 1 wherein the first plurality of spaced offset guide members comprise a plurality of guide members mounted on the first section for guiding the support members upwardly through said first section, a second plurality of spaced offset guide members mounted on the second section for guiding the support members upwardly through said second section and a third plurality of spaced offset guide members located above said second plurality of guide members and mounted on the second section for guiding said support members upwardly through said third section to said second plurality of spaced offset pairs of guide members.

3. A transport device according to claim 1 wherein the platform means further comprises cover means having s width corresponding to the displacement between the innermost support members and attached at its opposite ends to the first and last spaced rigid linear members composing the platform means.

4. A transport device according to claim 2 wherein the plurality of pairs of movable endless flexible support members comprise a plurality of pairs of flexible chains and have attached thereto coupling members for elevating the rigid linear members above the chain pairs and for coupling the rigid linear members to said plurality of pairs of flexible chains.

5. In a transport device, the improvement which comprises: at least three pairs of offset and movable endless flexible support members adapted to be driven in a plurality of directions and a load supporting platform means, the platform means comprising a plurality of spaced rigid linear members, each member being connected at its ends to one pair of said movable endless support members.

6. The transport device according to claim 5 wherein the first spaced rigid linear member is connected to the innermost endless flexible support member and the last rigid linear member is connected to the outermost endless flexible support member, the intervening members being connected selectively to the endless support flexible members separating the innermost and outermost flexible support members.

7. A transport device according to claim 5 wherein the platform means further comprises cover means having a width corresponding to the displacement between the innermost support members and attached at its opposite ends to the first and last spaced rigid linear members composing the platform means.

8. A transport device according to claim 5 wherein the flexible support members comprise flexible chains.

PO-1050
(5/69)

UNITED STATES PATENT OFFICE
CERTIFICATE OF CORRECTION

Patent No. 3,578,145          Dated    May 11, 1971

Inventor(s)      Guenther L. Kuehl

It is certified that error appears in the above-identified patent and that said Letters Patent are hereby corrected as shown below:

First Page, Second Col., line 2, under "References Cited - UNITED STATES PATENTS", "3,262,832" should be --3,263,832--;
Col. 2, line 35, "FIG. 9 ILLUSTRATES SCHEMATICALLY THE TRANSPORT DEVICE IN FIG. 8;" should be --FIG. 9 illustrates schematically the transport device in FIG. 8;--;
Col. 2, line 65, "being" should be --begin--;
Col. 3, line 2, "90° degrees" should be --ninety degrees--;
Col. 3, line 16, "firs" should be --first--;
Col. 3, line 49, "Form" should be --From--;
Col. 4, lines 62, 63, delete "and are laterally spaced from the guide sprockets 124a and 124b";
Col. 6, line 28, "includes" should be --include--;
Col. 7, line 67, "done" should be --alone--;
Col. 7, line 69, "364" should be --346--;
Col. 8, line 2, "on" should be --in--;
Col. 8, line 23, "the" (second occurrence) should be --then--;
Col. 8, line 39, delete "the" (second occurrence)--;
Col. 8, lines 61, 62, delete "which support the unit loads of material 360a-360n";
Col. 9, line 18, "so" should read --of--
Col. 9, line 39, "of" (second occurrence) should be --or--;
Col. 9, line 47, "the" (second occurrence) should be --to--.

Signed and sealed this 16th day of November 1971.

(SEAL)
Attest:

EDWARD M. FLETCHER, JR.      ROBERT GOTTSCHALK
Attesting Officer             Acting Commissioner of Patents